(12) United States Patent
Miyauchi et al.

(10) Patent No.: US 7,858,546 B2
(45) Date of Patent: Dec. 28, 2010

(54) MOTHER GLASS COMPOSITION FOR GRADIENT-INDEX LENS, GRADIENT-INDEX LENS, MANUFACTURING METHOD THEREOF, OPTICAL PRODUCT, AND OPTICAL DEVICE

(75) Inventors: Taro Miyauchi, Tokyo (JP); Tatsufumi Shiba, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 365 days.

(21) Appl. No.: 12/070,157

(22) Filed: Feb. 15, 2008

(65) Prior Publication Data

US 2008/0213495 A1 Sep. 4, 2008

(30) Foreign Application Priority Data

Feb. 19, 2007 (JP) ............................ 2007-037511

(51) Int. Cl.
*C03C 3/078* (2006.01)
*C03C 3/089* (2006.01)
*C03C 3/091* (2006.01)
*C03C 3/093* (2006.01)
*C03C 21/00* (2006.01)
*C03C 15/00* (2006.01)

(52) U.S. Cl. ............................ 501/72; 501/65; 501/66; 501/67; 65/400; 65/30.13

(58) Field of Classification Search ............... 501/63, 501/64, 65, 66, 67, 69, 70, 72; 65/30.13, 65/400
See application file for complete search history.

(56) References Cited

U.S. PATENT DOCUMENTS 3,827,785 A 8/1974 Matsushita et al.

(Continued)

FOREIGN PATENT DOCUMENTS

JP 51-21594 B 7/1976

(Continued)

OTHER PUBLICATIONS

Dimbleby, V. et al. "The relationship between Chemical Composition and the Resistance of Glasses to the Action of Chemical Reagents", Journal of the Society of Glass Technology, vol. 10, 1926, pp. 304-358.

*Primary Examiner*—Karl E Group
*Assistant Examiner*—Noah S Wiese
(74) *Attorney, Agent, or Firm*—Hamre, Schumann, Mueller & Larson, P.C.

(57) ABSTRACT

The present invention provides a mother glass composition for gradient-index lens, from which a lead-free Li-based gradient-index lens that is excellent in weather resistance, in particular weather resistance in the presence of water, can be manufactured. The mother glass composition includes the following components, indicated by mol %: $40 \leq SiO_2 \leq 65$; $1 \leq TiO_2 \leq 10$; $0.1 \leq MgO \leq 22$; $0.15 \leq ZnO \leq 15$; $2 \leq Li_2O \leq 18$; $2 \leq Na_2O \leq 20$; $0 \leq B_2O_3 \leq 20$; $0 \leq Al_2O_3 \leq 10$; $0 \leq K_2O \leq 3$; $0 \leq Cs_2O \leq 3$; $0 \leq Y_2O_3 \leq 5$; $0 \leq ZrO_2 \leq 2$; $0 \leq Nb_2O_5 \leq 5$; $0 \leq In_2O_3 \leq 5$; $0 \leq La_2O_3 \leq 5$; and $0 \leq Ta_2O_5 \leq 5$. The mother glass composition further includes at least two oxides selected from CaO, SrO, and BaO each in a range of 0.1 mol % to 15 mol %. The total of MgO+ZnO is greater than or equal to 2 mol %. The molar ratio of ZnO/(MgO+ZnO) is in a range of 0.07 to 0.93. The total of $Li_2O+Na_2O$ is in a range of 6 mol % to 38 mol %. The total of $Y_2O_3+ZrO_2+Nb_2O_5+In_2O_3+La_2O_3+Ta_2O_5$ is in a range of 0 mol % to 11 mol %.

19 Claims, 3 Drawing Sheets

U.S. PATENT DOCUMENTS

| | | | |
|---|---|---|---|
| 6,268,304 B1 * | 7/2001 | Maeda et al. | 501/65 |
| 6,387,510 B1 * | 5/2002 | Nakashima et al. | 428/426 |
| 6,476,975 B1 * | 11/2002 | Yoshii et al. | 359/652 |
| 6,764,972 B2 * | 7/2004 | Yoshii et al. | 501/63 |

FOREIGN PATENT DOCUMENTS

| | | |
|---|---|---|
| JP | 57-95848 A | 6/1982 |
| JP | 59-41934 B | 10/1984 |
| JP | 63-64941 A | 3/1988 |
| JP | 7-88234 B | 9/1995 |
| JP | 2001-139341 A | 5/2001 |
| JP | 2002-121048 A | 4/2002 |
| JP | 2002-211947 A | 7/2002 |
| JP | 2002-284543 A | 10/2002 |
| JP | 2005-298775 A | 10/2005 |

* cited by examiner

MOTHER GLASS COMPOSITION FOR GRADIENT-INDEX LENS, GRADIENT-INDEX LENS, MANUFACTURING METHOD THEREOF, OPTICAL PRODUCT, AND OPTICAL DEVICE

BACKGROUND OF THE INVENTION

1. Field of the Invention

The present invention relates to a mother glass composition for gradient-index lens suitable for manufacturing a gradient-index lens that is free from lead and having excellent weather-resistance. The present invention also relates to a gradient-index lens obtained from such a mother glass composition for gradient-index lens and a manufacturing method thereof as well as an optical product and an optical device each including the gradient-index lens.

2. Related Background Art

A gradient-index lens is in the shape of a rod or a fiber, and has a refractive index distribution that varies from its center to its periphery in the section thereof. The gradient-index lens is used extensively, for example, in optical products and optical devices, such as fiberscopes and optical communication devices. The gradient-index lens also is used extensively as an imaging optical element equipped to a copying machine, a facsimile, and an LED printer in the form of a lens array in which these lenses are aligned in arrays.

The gradient-index lens can be manufactured, for example, by an ion exchange method. To be more concrete, according to the ion exchange method, a mother glass composition molded into the shape of a rod or a fiber (glass fiber) is immersed in a molten salt. By exchanging an alkali metal element included in the composition and an alkali metal element included in the molten salt (these elements are of types different from each other) through the counter diffusion effect of ions, a refractive index distribution is provided to the inside of the glass fiber, and a gradient-index lens thus is formed.

Reference 1 (JP51-21594B) discloses a gradient-index lens with small chromatic aberration that is obtained through ion exchange between a glass fiber including Cs and a molten salt of potassium nitrate. Reference 2 (JP59-41934B) discloses a glass composition that includes $Li_2O$ and $Na_2O$ and is suitable for manufacturing a gradient-index lens having a large angular aperture. Reference 3 (JP7-88234B) discloses a glass composition for gradient-index lens including $Li_2O$ and $Na_2O$. From this glass composition, it is possible to manufacture a gradient-index lens having an angular aperture of 13° or larger and an effective field of view area of 90% or larger by regulating the molar ratio of these components to fall within a specific range.

Incidentally, there has been a need for a lead-free lens that is substantially free from lead from an environmental viewpoint in recent years. To this end, the applicant of the present invention discloses mother glass compositions for gradient-index lens that are substantially free from lead, for example, in Reference 4 (JP2001-139341A), Reference 5 (JP2002-121048A), Reference 6 (JP2002-211947A), and Reference 7 (JP2002-284543A).

However, when an attempt is made to manufacture a gradient-index lens having a large angular aperture using a glass composition that is substantially free from lead, properties of the manufactured lens, in particular weather resistance, are deteriorated in some cases. This is attributed to the fact that in order to eliminate the content of lead, which had been a component necessary to increase an angular aperture of the lens, the content of Li that also has an effect of increasing an angular aperture has to be increased, which eases the migration (increases the mobility) of alkali ions in the glass composition. The applicant developed a mother glass composition for gradient-index lens that is substantially free from lead and yet capable of reducing the mobility of alkali ions by adding elements that inhibit migration of alkali ions, such as Ba, Sr, Ca, and Mg, while controlling the content of Li adequately. This mother glass composition is disclosed in Reference 8 (JP2005-298775A).

In the glass composition disclosed in Reference 8, the mobility of alkali ions is reduced, and by using this composition, it is possible to manufacture a gradient-index lens that is excellent in various properties, such as weather resistance, strength, and reproducibility of angular aperture, in comparison with a case where a conventional Li-based lead-free glass composition is used. The weather resistance, however, is not necessarily satisfactory, in particular the exposure to moisture, and it is to be hoped that the weather resistance will be further improved.

SUMMARY OF THE INVENTION

It is an object of the present invention to provide a glass composition, which is a Li-based mother glass composition for gradient-index lens that is substantially free from lead, and from which a gradient-index lens that is excellent in weather resistance, in particular weather resistance (water resistance) under the environment in the presence of water, can be manufactured.

It is also an object of the present invention to provide a gradient-index lens that is manufactured from the glass composition as above and excellent in weather resistance, in particular water resistance and the manufacturing method thereof as well as an optical product and an optical device each including this lens.

A mother glass composition for gradient-index lens (hereinafter, also referred to simply as "mother glass composition") of the present invention includes the following components, indicated by mol %:

$40 \leq SiO_2 \leq 65$;
$1 \leq TiO_2 \leq 10$;
$0.1 \leq MgO \leq 22$;
$0.15 \leq ZnO \leq 15$;
$2 \leq Li_2O \leq 18$;
$2 \leq Na_2O \leq 20$;
$0 \leq B_2O_3 \leq 20$;
$0 \leq Al_2O_3 \leq 10$;
$0 \leq K_2O \leq 3$;
$0 \leq Cs_2O \leq 3$;
$0 \leq Y_2O_3 \leq 5$;
$0 \leq ZrO_2 \leq 2$;
$0 \leq Nb_2O_5 \leq 5$;
$0 \leq In_2O_3 \leq 5$;
$0 \leq La_2O_3 \leq 5$; and
$0 \leq Ta_2O_5 \leq 5$, wherein the mother glass composition further includes at least two oxides selected from the group consisting of CaO, SrO, and BaO, each in a range of 0.1 mol % to 15 mol %, where the total of MgO+ZnO is greater than or equal to 2 mol %, the molar ratio of ZnO/(MgO+ZnO) is in a range of 0.07 to 0.93, the total of $Li_2O+Na_2O$ is in a range of 6 mol % to 38 mol %, and the total of $Y_2O_3+ZrO_2+Nb_2O_5+In_2O_3+La_2O_3+Ta_2O_5$ is in a range of 0 mol % to 11 mol %.

A gradient-index lens of the present invention is a lens obtained by providing a glass fiber made of the mother glass composition of the present invention described above with a refractive index distribution by an ion exchange method.

An optical product of the present invention includes the gradient-index lens of the present invention described above.

An optical device of the present invention includes the optical product of the present invention described above.

A method for manufacturing a gradient-index lens of the present invention is a manufacturing method, in which a glass fiber made of a glass composition including an oxide of an alkali metal element as a component is immersed in a molten salt including an alkali metal element different from the element in the glass fiber for letting ion exchange take place between the element in the glass fiber and the element in the molten salt, so that an refractive index distribution is provided to the glass fiber. The glass composition includes the following components, indicated by mol %:

$40 \leq SiO_2 \leq 65$;
$1 \leq TiO_2 \leq 10$;
$0.1 \leq MgO \leq 22$;
$0.15 \leq ZnO \leq 15$;
$2 \leq Li_2O \leq 18$;
$2 \leq Na_2O \leq 20$;
$0 \leq B_2O_3 \leq 20$;
$0 \leq Al_2O_3 \leq 10$;
$0 \leq K_2O \leq 3$;
$0 \leq Cs_2O \leq 3$;
$0 \leq Y_2O_3 \leq 5$;
$0 \leq ZrO_2 \leq 2$;
$0 \leq Nb_2O_5 \leq 5$;
$0 \leq In_2O_3 \leq 5$;
$0 \leq La_2O_3 \leq 5$; and
$0 \leq Ta_2O_5 \leq 5$, wherein the glass composition further includes at least two oxides selected from the group consisting of CaO, SrO, and BaO, each in a range of 0.1 mol % to 15 mol %, where the total of MgO+ZnO is greater than or equal to 2 mol %, the molar ratio of ZnO/(MgO+ZnO) is in a range of 0.07 to 0.93, the total of $Li_2O+Na_2O$ is in a range of 6 mol % to 38 mol %, and the total of $Y_2O_3+ZrO_2+Nb_2O_5+In_2O_3+La_2O_3+Ta_2O_5$ is in a range of 0 mol % to 11 mol %.

The inventors found that by including ZnO as an essential component and controlling the total of the contents of ZnO and MgO as well as the molar ratio of ZnO and MgO in the mother glass composition described in Reference 8, it is possible to enhance weather resistance of a gradient-index lens manufactured from the mother glass composition, and achieved the present invention.

It is understood generally that weather resistance of silicate glass is improved by adding ZnO. A case where ZnO substitutes for an alkali component in a glass composition is reported, for example, in V. Dimbleby, and W. E. S. Turner, *Journal of the Society of Glass Technology*, 10, 304 (1926). It is, however, also well known that the magnitude of the content of the alkali component gives influence to weather resistance of silicate glass. Accordingly, it is an extremely natural phenomenon that the weather resistance of the glass is improved when the alkali component in the glass is substituted with Zn, which is a non-alkali component.

On the contrary, a phenomenon discovered by the inventors is totally different from such a natural phenomenon. In the present invention, not the alkali component, but a moiety of MgO is substituted with ZnO. A phenomenon in which weather resistance, in particular water resistance, of the gradient-index lens obtained after ion exchange can be enhanced by such substitution in a Li-based mother glass composition has been totally unknown.

According to the mother glass composition of the present invention, in which the contents of MgO and ZnO are controlled, it is possible to obtain a gradient-index lens that is excellent in various properties and with further enhanced weather resistance in comparison with the Li-based lead-free gradient-index lens described in Reference 8. In addition, it is possible to form a high-performance gradient-index lens array with excellent weather resistance from the resulting lenses. For example, it is possible to achieve a high-quality optical product or optical device with excellent durability that hardly undergoes deterioration upon exposure to the environment and deterioration with time.

DETAILED DESCRIPTION OF THE INVENTION

Mother Glass Composition for Gradient-Index Lens

Figure 1:
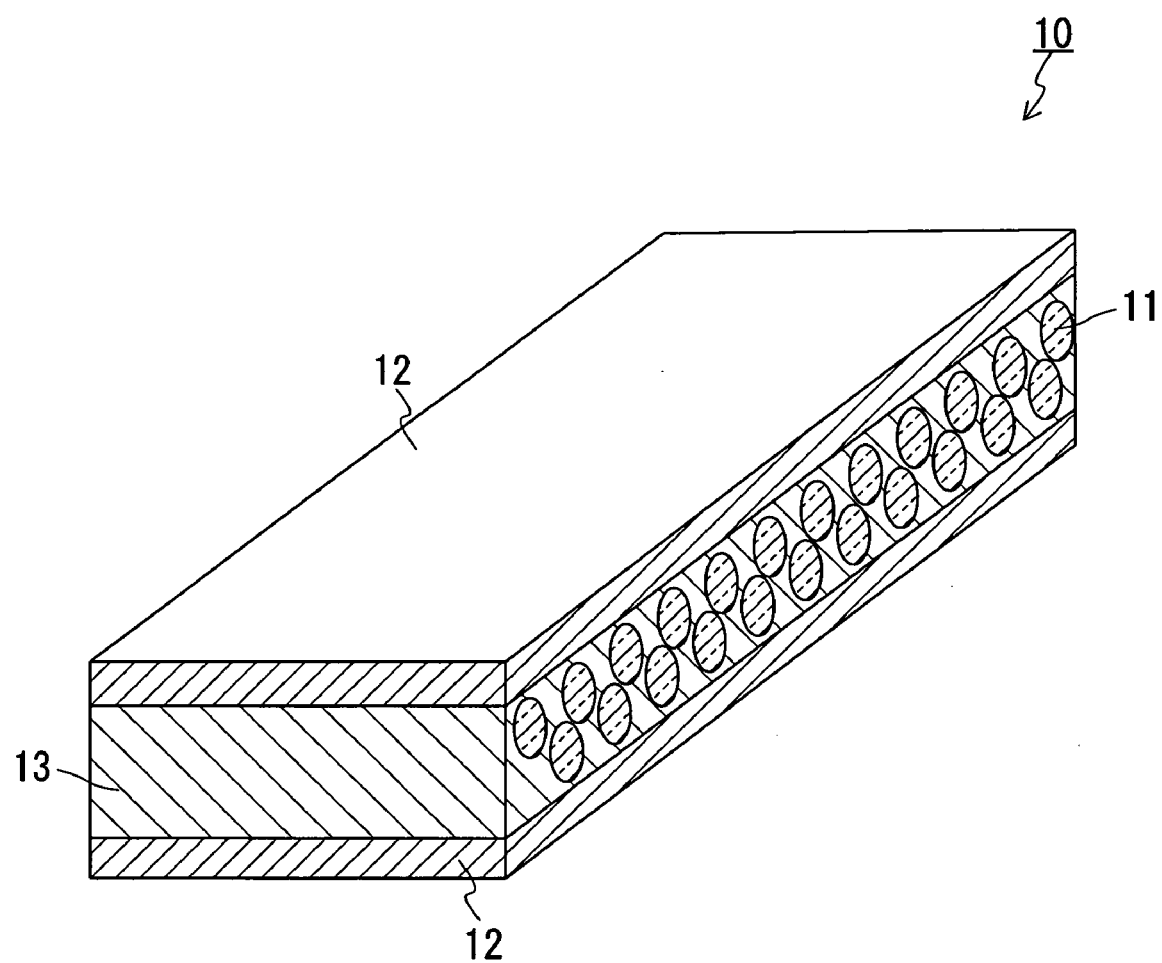
FIG. 1 is a schematic view showing an example of the configuration of a lens array, which is an optical device including gradient-index lenses of the present invention.

A mother glass composition for gradient-index lens of the present invention includes the following components, indicated by mol %:

$40 \leq SiO_2 \leq 65$;
$1 \leq TiO_2 \leq 10$;
$0.1 \leq MgO \leq 22$;
$0.15 \leq ZnO \leq 15$;
$2 \leq Li_2O \leq 18$;
$2 \leq Na_2O \leq 20$;
$0 \leq B_2O_3 \leq 20$;
$0 \leq Al_2O_3 \leq 10$;
$0 \leq K_2O \leq 3$;
$0 \leq Cs_2O \leq 3$;
$0 \leq Y_2O_3 \leq 5$;
$0 \leq ZrO_2 \leq 2$;
$0 \leq Nb_2O_5 \leq 5$;
$0 \leq In_2O_3 \leq 5$;
$0 \leq La_2O_3 \leq 5$; and
$0 \leq Ta_2O_5 \leq 5$, wherein the mother glass composition further includes at least two oxides selected from the group consisting of CaO, SrO, and BaO, each in a range of 0.1 mol % to 15 mol %, where the total of MgO+ZnO is greater than or equal to 2 mol %, the molar ratio of ZnO/(MgO+ZnO) is in a range of 0.07 to 0.93, the total of $Li_2O+Na_2O$ is in a range of 6 mol % to 38 mol %, and the total of $Y_2O_3+ZrO_2+Nb_2O_5+In_2O_3+La_2O_3+Ta_2O_5$ is in a range of 0 mol % to 11 mol %.

The reason for limiting the composition of the mother glass composition of the present invention will be described below. In the following descriptions, the unit "%" by which the composition is indicated denotes "mol %".

$SiO_2$ $SiO_2$ is a component that forms a network structure of glass. The $SiO_2$ content of less than 40% relatively increases the contents of other components necessary to allow the optical properties as a gradient-index lens to develop after ion exchange. In this case, thus, devitrification tends to occur. In addition, the $SiO_2$ content of less than 40% markedly deteriorates chemical durability as a glass composition. Meanwhile, the $SiO_2$ content exceeding 65% limits the contents of the other components, for example, an alkali component needed to form a refractive index distribution, a component for increasing a refractive index, and a component for adjusting a physical property value. In this case, it becomes difficult to obtain a practical mother glass composition. The $SiO_2$ content is therefore set to a range of 40% to 65%.

$TiO_2$ $TiO_2$ is a component that has an effect of increasing a refractive index of the mother glass composition. By increasing the refractive index of the mother glass composition, it is possible to increase a center refractive index and an angular aperture θ of a gradient-index lens obtained from the glass composition. In addition, by increasing the $TiO_2$ content, it is possible to bring the refractive index distribution as a gradient-index lens into a more ideal condition. A lens that excels in resolution thus can be manufactured. When the $TiO_2$ content is 10%, deterioration of resolution of the resulting lens is not observed, whereas when the $TiO_2$ content is less than 1%, the resolution deteriorates noticeably and a practical lens cannot be obtained. On the other hand, when the $TiO_2$ content exceeds 10%, chromatic aberration of the resulting lens increases with increment in coloration of the lens. Hence, a practical lens cannot be obtained, either. Accordingly, in order to obtain a lens having high resolution and small chromatic aberration, the $TiO_2$ content is set to a range of 1% to 10%. The $TiO_2$ content is preferably in a range of 2% to 8%.

MgO

MgO is a component that has an effect of lowering the melting temperature of the mother glass composition and increasing a difference (Δn) in refractive index between the center and the periphery of a lens formed in ion exchange. When the MgO content exceeds 22%, devitrification tends to occur. In addition, when the MgO content exceeds 22%, the contents of other components are excessively reduced, thus, a practical glass composition cannot be obtained. The MgO content therefore is set to a range of 0.1% to 22%.

The MgO content is preferably 2% or greater because not only can a sufficient difference in refractive index be achieved, but also the contents of alkaline-earth metal oxides (CaO, SrO, and BaO) can be controlled more properly with the aim of further reducing the mobility of alkali ions. In short, the MgO content is preferable in a range of 2% to 22%, and more preferably, in a range of 2% to 16%.

ZnO, MgO+ZnO, and ZnO/(MgO+ZnO)

ZnO is a component that has an effect of enhancing weather resistance of the mother glass composition and a gradient-index lens obtained through ion exchange of this composition. In the present invention, it is a component that is added for substitution for a moiety of MgO.

In order to obtain a mother glass composition or a gradient-index lens that is excellent in weather resistance, the ZnO content has to be in a range of 0.15% to 15%. In this instance, the total of the contents of MgO and ZnO (i.e. MgO+ZnO) is set to 2% or greater, and a content ratio (molar ratio) of MgO and ZnO, expressed as ZnO/(MgO+ZnO), is set to a range of 0.07 to 0.93, that is, $0.07 \leq ZnO/(MgO+ZnO) \leq 0.93$.

In order to achieve higher weather resistance, it is preferable to set the ZnO content to a range of 3% to 15%. In this instance, it is sufficient to set MgO+ZnO to 6% or greater, and the lower limit of the content ratio of MgO and ZnO is 0.12 because of the range of the content of each component, that is, $0.12 \leq ZnO/(MgO+ZnO) \leq 0.93$. From the viewpoint of devitrification resistance, the ZnO content is preferably 8% or less.

In order to achieve further higher weather resistance, it is preferable to set the ZnO content to a range of 4% to 15%, and it is preferable to set MgO+ZnO to 6% or greater, and more preferably, to a range of 6% to 22%. Herein, MgO+ZnO can be 15% or less. In addition, ZnO/(MgO+ZnO) is preferably in a range of 0.07 to 0.9, and more preferably in a range of 0.25 to 0.85, a range of 0.25 to 0.8, and a range of 0.3 to 0.8.

$Li_2O$ $Li_2O$ is a component, and it is one of the most important components to obtain a gradient-index lens through ion exchange of the mother glass composition of the present invention. The $Li_2O$ content of less than 2% does not allow a satisfactory concentration distribution, that is, a satisfactory refractive index distribution, to develop through ion exchange. Hence, a gradient-index lens cannot be obtained. When the $Li_2O$ content exceeds 18%, devitrification tends to occur. This makes it difficult to form a mother glass composition and should a glass composition be formed, it has poor weather resistance. The $Li_2O$ content therefore is set to a range of 2% to 18%. The $Li_2O$ content is preferably in a range of 2% to 12%, more preferably, in a range of 2% to less than 12%, and further preferably in a range of 5% to 12% and a range of 5% to less than 12%.

$Na_2O$ $Na_2O$ is a component that has not only an effect of lowering the melting temperature of the mother glass composition, but also an effect of promoting ion exchange between Li in the composition and an ion (exchanging species) in a molten salt by maintaining adequate mobility for ions by a so-called mixed alkali effect when the mother glass composition of the present invention is subjected to ion exchange. By maintaining adequate mobility for ions during ion exchange, it is possible to adjust an ion exchange rate properly, which makes it possible to tune the optical properties of the resulting gradient-index lens. When the content of $Na_2O$ is less than 2%, the melting temperature of the mother glass composition is raised noticeably, which makes it difficult to form a glass fiber. In addition, the effect of maintaining adequate mobility for ions during ion exchange cannot be achieved in a satisfactory manner. When the content of $Na_2O$ exceeds 20%, chemical durability as the mother glass composition is deteriorated, and the resulting lens lacks in practicality. The $Na_2O$ content is therefore set to a range of 2% to 20%. The $Na_2O$ content is preferably in a range of 2% to 15%, and more preferably, in a range of 5% to 15%.

$Li_2O+Na_2O$

In the mother glass composition of the present invention, the total of the contents of $Li_2O$ and $Na_2O$ (i.e. $Li_2O+Na_2O$) is set to a range of 6% to 38%. By limiting $Li_2O+Na_2O$ to this range, it is possible to obtain satisfactory resolution when this glass composition is made into a gradient-index lens. $Li_2O+Na_2O$ is preferably in a range of 6% to less than 32%, more preferably, in a range of 6% to less than 27%, and further preferably, in a range of 10% to less than 27%.

$Li_2O/Na_2O$

In the mother glass composition of the present invention, it is preferable to set the content ratio (molar ratio) of $Li_2O$ and $Na_2O$, which is indicated as $Li_2O/Na_2O$, to a range of 0.7 to 2.

For example, in a case where high resolution is required as a gradient-index lens, it is preferable to set the ratio to a range of 0.7 to 1.5. The most satisfactory resolution can be achieved in this range. Also, in a case where, for example, a large angular aperture θ is required as a gradient-index lens, it is preferable to set the ratio to a range of 1.0 to 2.0. The angular aperture θ of the lens can reach the maximum in this range.

CaO, SrO, and BaO

CaO, SrO, and BaO are the important components that have an effect of reducing the mobility of alkali ions contained in the mother glass composition of the present invention. The mother glass composition of the present invention includes at least two oxides selected from the group consisting of CaO, SrO, and BaO. Each content of the at least two oxides is in a range of 0.1% to 15%. When each content of two oxides selected from CaO, SrO, and BaO is less than 0.1%, the content of the remaining one oxide increases relatively, thus, entropy of the mother glass composition decreases. Accordingly, crystals resulting from the remaining oxide are produced easily and devitrification tends to occur. When the content of at least one oxide selected from CaO, SrO, and BaO exceeds 15%, crystals resulting from the at least one oxide are produced easily, and devitrification tends to occur, too. In view of the foregoing, in the present invention, the mother glass composition includes at least two alkaline-earth metal oxides selected from CaO, SrO, and BaO each in a range of 0.1% to 15% in content. Each content of the at least two oxides is preferably in a range of 2% to 12%.

BaO, SrO, and CaO, in this order, have a higher effect of reducing the mobility of alkali ions. It is therefore preferable to set each content of SrO and BaO to a range of 0.1% to 15%, and the content of CaO to a range of 0% to 15%. Also, it is more preferable to set each content of SrO and BaO to a range of 2% to 12%, and the content of CaO to a range of 0% to 15%.

To be more concrete, it is preferable that the mother glass composition of the present invention includes SrO and BaO each in a range of 0.1% to 15%, and it is more preferable that the composition includes SrO and BaO each in a range of 2% to 12%.

Although BaO alone can reduce the mobility of alkali ions contained in the mother glass composition, adding BaO together with SrO can suppress crystallization that occurs when molding the mother glass composition. More specifically, by substituting Sr for a moiety of Ba, production of crystals containing, for example, Ba—Ti—O, can be suppressed. It is thus possible to suppress crystallization (devitrification) during molding.

The mobility of alkali ions allowed in the mother glass composition varies with the diameter of a glass fiber formed from the composition. Accordingly, the contents of BaO, SrO, and CaO are selected with respect to the diameter of a desired gradient-index lens by taking the production costs into account.

The total of the contents of CaO, SrO, and BaO (i.e. CaO+SrO+BaO) in the mother glass composition of the present invention is preferably in a range of 2% to 25%, and more preferably, in a range of 4% to 20%.

The total of the contents of MgO, CaO, SrO, and BaO (i.e. MgO+CaO+SrO+BaO) in the mother glass composition of the present invention is preferably in a range of 5% to 47%, and more preferably, in a range of 5% to 36%.

From a viewpoint different from the above, in the mother glass composition of the present invention, it is preferable that at least two values of the molar ratios selected from:
CaO/(CaO+SrO+BaO);
SrO/(CaO+SrO+BaO); and
BaO/(CaO+SrO+BaO) are 0.1 or greater, and it is more preferable that the at least two values are 0.2 or greater. When the two values of the molar ratios are less than 0.1, the remaining one value becomes larger, that is, the content of a particular one oxide selected from CaO, SrO, and BaO increases relatively. Accordingly, entropy of the mother glass composition decreases, and, thus, crystals resulting from this oxide are produced easily and devitrification tends to occur.

The mother glass composition of the present invention further may include the following components.

$B_2O_3$ $B_2O_3$ is an optional component that forms a network structure of glass, and has an effect of promoting vitrification of the mother glass composition and adjusting viscosity thereof while hardly changing the resolution and an angular aperture θ of the resulting gradient-index lens. In addition, although the extent of which is small, it also has an effect of impeding the ion exchange rate of the mother glass composition.

$B_2O_3$ may be added in a case, for example, where the contents of a part of components become relatively large as a glass composition and the glass stability is deteriorated (for example, devitrification tends to occur), even though the contents of the components described above are in the ranges specified in the present invention. By adding $B_2O_3$, it is possible to reduce the contents of the part of components that has become relatively large without changing the proportions among the contents of the components.

The content of $B_2O_3$ that can be added without changing the resolution and an angular aperture θ of the resulting lens is 20% or less. The $B_2O_3$ content is therefore set to a range of 0% to 20%. The $B_2O_3$ content is preferably in a range of 0% to 10%, and in a case where the mother glass composition of the present invention includes $B_2O_3$, the $B_2O_3$ content is preferably in a range of 1% to 10%.

$Al_2O_3$

The mother glass composition of the present invention may include $Al_2O_3$ as an optional component and the $Al_2O_3$ content is in a range of 0% to 10%.

$SiO_2+TiO_2+B_2O_3+Al_2O_3$

In the mother glass composition of the present invention, the total of the contents of $SiO_2$, $TiO_2$, $B_2O_3$, and $Al_2O_3$ (i.e. $SiO_2+TiO_2+B_2O_3+Al_2O_3$) is preferably in a range of 41% to 70%, and more preferably, in a range of 50% to 70%.

$Y_2O_3$, $ZrO_2$, $Nb_2O_5$, $In_2O_3$, $La_2O_3$, and $Ta_2O_5$

With the aim of adjusting the refractive index or enhancing the weather resistance of the resulting gradient-index lens after ion exchange, the mother glass composition of the present invention may include the respective components in the heading above. It is sufficient that the contents of the respective components are, in total, in a range of 0% to 11%. In a case where the mother glass composition of the present invention includes these components, the total of the contents thereof is preferably in a range of 0.2% to 6%. Also, as is described in Reference 8 (JP2005-289775A), it is preferable that the total of the contents of this components and the content of ZnO is 15% or less.

The content of $Y_2O_3$ is preferably in a range of 0% to 5%.

The content of $ZrO_2$ is preferably in a range of 0% to 2%, and in a case where the mother glass composition of the present invention includes $ZrO_2$, the content of $ZrO_2$ is preferably in a range of 0.2% to 2%.

The contents of $Nb_2O_5$, $In_2O_3$, $La_2O_3$, and $Ta_2O_5$ are preferably each in a range of 0% to 5%.

$K_2O$ and $Cs_2O$

As with MgO, CaO, SrO, and BaO, $K_2O$ and $Cs_2O$ are optional components that have an effect of reducing the mobility of alkali ions by the mixed alkali effect. The contents of $K_2O$ and $Cs_2O$ are preferably each in a range of 0% to 3%.

Other Components

The mother glass composition of the present invention may include, as another component, $GeO_2$ in a range of 0% to 10%. The composition may include, as additives, $SnO_2$, $As_2O_3$, and $Sb_2O_3$ each in a range of 0% to 1%.

The mother glass composition of the present invention may substantially consist of the components as specified above. In this case, the contents of the respective components contained in the glass composition and the relation among the contents of the respective components (the total and the content ratio) are determined according to the respective rules described above.

The term, "substantially consists of", referred to herein is used to allow for the content of impurities of less than 0.1%.

Lead

The mother glass composition of the present invention is substantially free from lead (the typical composition is PbO). A refractive-index lens formed using the mother glass composition of the present invention is also substantially free from lead. The term, "substantially free", referred to herein means that the content is less than 0.1%.

Specific composition examples of the mother glass composition of the present invention will be described below.

The mother glass composition of the present invention may include the following components, indicated by mol %:

$40 \leq SiO_2 \leq 65$;
$1 \leq TiO_2 \leq 10$;
$2 \leq MgO \leq 22$;
$4 \leq ZnO \leq 15$;
$0 \leq CaO \leq 15$;
$0.1 \leq SrO \leq 15$;
$0.1 \leq BaO \leq 15$;
$2 \leq Li_2O < 12$;
$2 \leq Na_2O \leq 15$;
$0 \leq B_2O_3 \leq 20$;
$0 \leq Al_2O_3 \leq 10$;
$0 \leq K_2O \leq 3$;
$0 \leq Cs_2O \leq 3$;
$0 \leq Y_2O_3 \leq 5$;
$0 \leq ZrO_2 \leq 2$;
$0 \leq Nb_2O_5 \leq 5$;
$0 \leq In_2O_3 \leq 5$;
$0 \leq La_2O_3 \leq 5$; and
$0 \leq Ta_2O_5 \leq 5$, where the total of MgO+ZnO is greater than or equal to 6 mol %, the molar ratio of ZnO/(MgO+ZnO) is in a range of 0.25 to 0.85, the total of CaO+SrO+BaO is in a range of 2 mol % to 25 mol %, the total of MgO+CaO+SrO+BaO is in a range of 5 mol % to 47 mol %, the total of $Li_2O+Na_2O$ is in a range of 6 mol % to less than 27 mol %, the total of $SiO_2+TiO_2+Ba_2O_3+Al_2O_3$ is in a range of 41 mol % to 70 mol %, and the total of $Y_2O_3+ZrO_2+Nb_2O_5+In_2O_3+La_2O_3+Ta_2O_5$ is in a range of 0 mol % to 11 mol %.

Alternatively, the mother glass composition of the present invention may include the following components, indicated by mol %:

$40 \leq SiO_2 \leq 65$;
$1 \leq TiO_2 \leq 10$;
$2 \leq MgO \leq 16$;
$4 \leq ZnO \leq 8$;
$0 \leq CaO \leq 15$;
$2 \leq SrO \leq 12$;
$2 \leq BaO \leq 12$;
$5 \leq Li_2O < 12$;
$5 \leq Na_2O \leq 15$;
$0 \leq B_2O_3 \leq 10$;
$0 \leq Al_2O_3 \leq 10$;
$0 \leq K_2O \leq 3$;
$0 \leq Cs_2O \leq 3$;
$0 \leq Y_2O_3 \leq 5$;
$0.2 \leq ZrO_2 \leq 2$;
$0 \leq Nb_2O_5 \leq 5$;
$0 \leq In_2O_3 \leq 5$;
$0 \leq La_2O_3 \leq 5$; and
$0 \leq Ta_2O_5 \leq 5$, where the total of MgO+ZnO is in a range of 6 mol % to 22 mol %, the molar ratio of ZnO/(MgO+ZnO) is in a range of 0.25 to 0.8, the total of CaO+SrO+BaO is in a range of 4 mol % to 20 mol %, the total of MgO+CaO+SrO+BaO is in a range of 5 mol % to 36 mol %, the total of $Li_2O+Na_2O$ is in a range of 10 mol % to less than 27 mol %, the molar ratio of $Li_2O/Na_2O$ is in a range of 0.7 to 2, the total of $SiO_2+TiO_2+Ba_2O_3+Al_2O_3$ is in a range of 50 mol % to 70 mol %, and the total of $Y_2O_3+ZrO_2+Nb_2O_5+In_2O_3+La_2O_3+Ta_2O_5$ is in a range of 0.2 mol % to 6 mol %.

Further, the mother glass composition of the present invention may include the following components, indicated by mol %:

$40 \leq SiO_2 \leq 65$;
$2 \leq TiO_2 \leq 8$;
$2 \leq MgO \leq 16$;
$4 \leq ZnO \leq 8$;
$0 \leq CaO \leq 15$;
$2 \leq SrO \leq 12$;
$2 \leq BaO \leq 12$;
$5 \leq Li_2O \leq 12$;
$5 \leq Na_2O = 15$;
$0 \leq B_2O_3 \leq 10$;
$0 \leq Al_2O_3 \leq 10$;
$0 \leq K_2O \leq 3$;
$0 \leq Cs_2O \leq 3$;
$0 \leq Y_2O_3 \leq 5$;
$0.2 \leq ZrO_2 \leq 2$;
$0 \leq Nb_2O_5 \leq 5$;
$0 \leq In_2O_3 \leq 5$;
$0 \leq La_2O_3 \leq 5$; and
$0 \leq Ta_2O_5 \leq 5$, where the total of MgO+ZnO is in a range of 6 mol % to 22 mol %, the molar ratio of ZnO/(MgO+ZnO) is in a range of 0.25 to 0.8, the total of CaO+SrO+BaO is in a range of 4 mol % to 20 mol %, the total of MgO+CaO+SrO+BaO is in a range of 5 mol % to 36 mol %, the total of $Li_2O+Na_2O$ is in a range of 10 mol % to less than 27 mol %, the molar ratio of $Li_2O/Na_2O$ is in a range of 0.7 to 2, the total of $SiO_2+TiO_2+Ba_2O_3+Al_2O_3$ is in a range of 50 mol % to 70 mol %, and the total of $Y_2O_3+ZrO_2+Nb_2O_5+In_2O_3+La_2O_3+Ta_2O_5$ is in a range of 0.2 mol % to 6 mol %.

Refractive-Index Lens and Manufacturing Method thereof

A refractive-index lens of the present invention is a lens obtained by providing a glass fiber made of the mother glass composition of the present invention described above with a refractive index distribution by an ion exchange method, and it is excellent in weather resistance, in particular the weather resistance (water resistance) under the environment in the presence of water. In addition, the lens of the present invention is a lead-free gradient-index lens having excellent optical properties such as high resolution and a large angular aperture θ. Applications of the lens of the present invention are not particularly limited, and for example, it can be used in an optical product or an optical device described below. It should be noted that the lens of the present invention is particularly suitable for a color scanner owing to its smallness of chromatic aberration that depends on the wavelength of the light source used.

The gradient-index lens of the present invention may have a structure that eliminates noise light (so-called white nose (stray light)) generated when incident light having an angle of incidence larger than the angular aperture θ is reflected on the side surface of the lens. Examples of such a structure include an absorber layer or a scattering layer provided to the side surface of the lens. To be more concrete, the gradient-index lens may be a lens having the core/clad structure in which a colored layer that serves as an absorber layer is disposed on the side surface of the lens or a lens provided with a microscopic concavo-convex portion that serves as a scattering layer.

The gradient-index lens of the present invention can be formed, for example, by the method of the present invention for manufacturing a gradient-index lens.

According to the manufacturing method of the present invention, a glass fiber made of a glass composition including an oxide of an alkali metal element as a component is immersed in a molten salt including an alkali metal element different from the element in the glass fiber, and a refractive index distribution is provided to the glass fiber by letting ion exchange take place between the alkali metal element in the glass fiber and the alkali metal element in the molten salt. The glass composition forming the glass fiber is the mother glass composition for gradient-index lens of the present invention described above.

The ion exchange of the glass fiber can be carried out according to any known method.

Optical Product and Optical Device

The type and configuration of an optical product of the present invention are not particularly limited as long as the product includes the gradient-index lens of the present invention described above. An example of the optical product, a lens array in which at least two gradient-index lenses of the present invention are aligned in arrays so that their optical axes are almost parallel to each other. The lens array including the lenses of the present invention with excellent optical properties makes it possible to obtain a wide range of erected images at equal magnification while making the diameter of each individual lens smaller.

In a case where the gradient-index lenses of the present invention are aligned in arrays to form a lens array, the manner in which the lenses are aligned is not particularly limited. For example, lenses may be aligned in 0-dimensional to 2-dimensional arrays. The term, "0-dimensional array", means that a single lens is disposed independently and used as an optical element.

FIG. 1 shows an example of a lens array formed of the lenses of the present invention aligned in a 2-dimensional array.

A lens array 10 shown in FIG. 1 includes at least two gradient-index lenses 11 of the present invention. The respective lenses 11 are aligned in such a manner that the optical axes of the lenses 11 are almost parallel to one another, and these lenses 11 together with a pair of FRP substrates 12 and black resin 13 are made into one unit. The lens array 10 as above is formed as follows. That is, at least two lenses 11 are aligned almost in parallel with each other on the surface of one of the FRP substrates 12 and the lenses 11 are sandwiched with the use of the other FRP substrate 12. Then, a space between a pair of the FRP substrates 12 is filled with the black resin 13 to make all the portions into one unit, followed by polishing on the end faces of the lenses 11.

The configuration of the lens array including the lenses of the present invention is not limited to the example shown in FIG. 1. Materials used for the respective portions that together form the lens array can be the same materials generally used for a lens array. The alignment of the lenses 11 is not limited to two arrays as shown in FIG. 1, either. A lens array corresponding to a large area may be formed by aligning the lenses 11 in a large number of arrays.

The optical product of the present invention, for example, a lens array, is excellent in weather resistance, in particular water resistance. In addition, because it has excellent optical properties, for example, high resolution, a large angular aperture θ, and small chromatic aberration, it can be used extensively as optical devices, such as a scanner, a copying machine, and a facsimile.

The type and configuration of the optical device of the present invention are not particularly limited as long as the device includes the optical product of the present invention, for example, a lens array, described above. Examples of such an optical device include a scanner, a copying machine, and a facsimile equipped with an image reader into which the lens array is incorporated, or an optical printer equipped with an image processor into which the lens array together with a light emitting element is incorporated.

Figure 2:
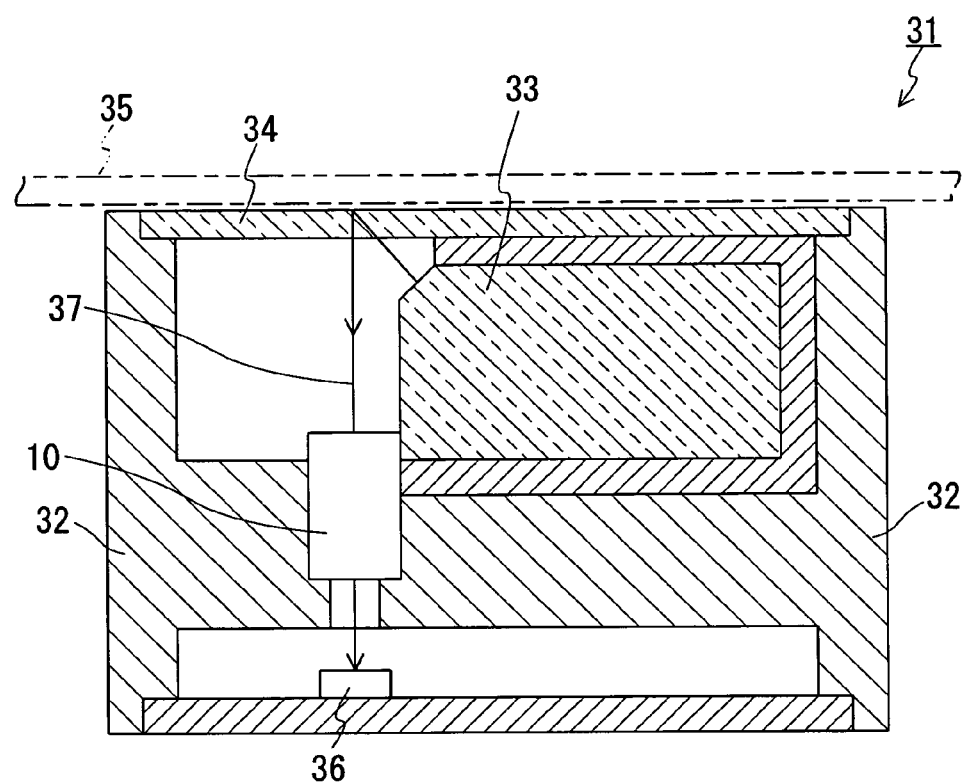
FIG. 2 is a schematic view showing an example of an optical device (scanner) including a lens array, which is one type of the optical device of the present invention.

FIG. 2 shows a scanner as an example of the optical device of the present invention. A scanner 31 shown in FIG. 2 includes, inside a case 32, a linear lighting unit 33, a document glass 34 formed of a glass sheet, a lens array 10, and a photodetector 36. The lens array 10 is disposed on an optical path 37, along which light is emitted from the linear lighting unit 33 to a manuscript 35 when the manuscript 35 is placed on the document glass 34 and reflected on the surface of the manuscript 35 to go incident on the photodetector 36. The lens array 10 serves as an imaging optical system for the reflected light to form an image in the photodetector 36.

Figure 3:
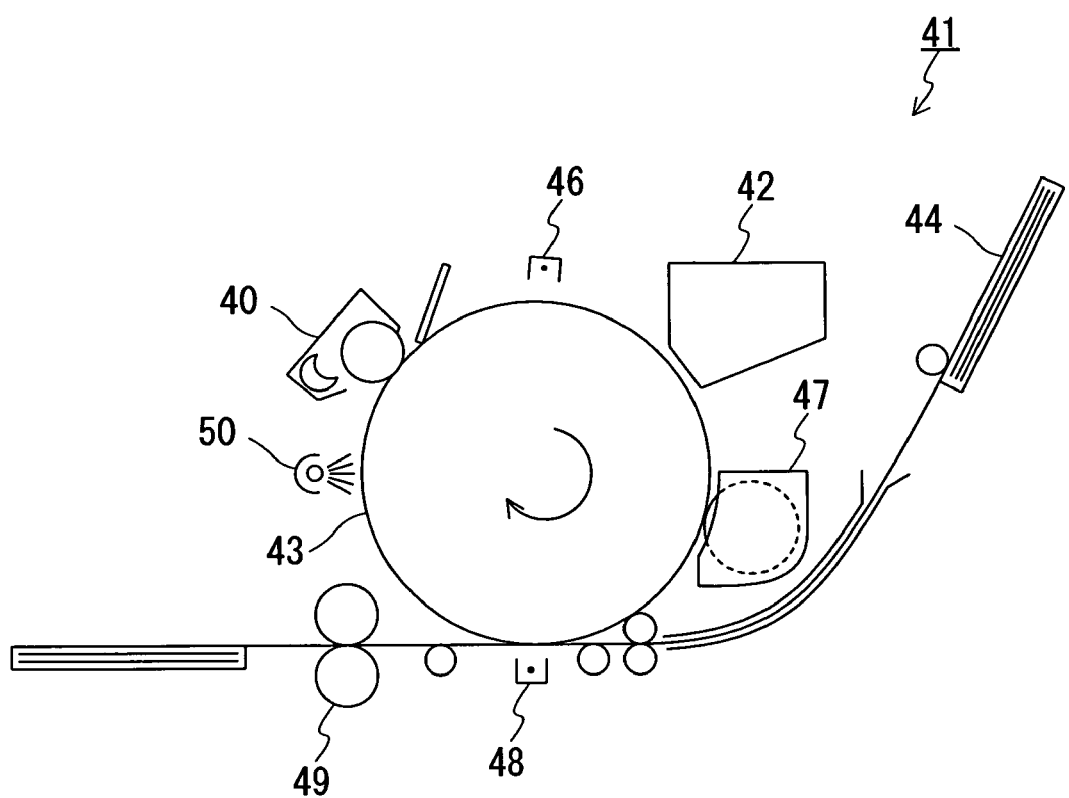
FIG. 3 is a schematic view showing an example of an optical device (optical printer) including a lens array, which is one type of the optical device of the present invention.

FIG. 3 shows an optical printer as another example of the optical device of the present invention. An optical printer 41 shown in FIG. 3 is an apparatus that forms an image (latent image) by exposing a photoconductor drum 43 to light with a write head (an optical write head) 42, and then fixes the image thus formed onto a paper 44. The write head 42 includes the lens array 10 and a light emitting element array. The lens array 10 serves as an imaging optical system for the photoconductor drum 43 to be exposed to light emitted from the light emitting element array (to be more specific, the lens array 10 serves as an optical system in which erected images at equal magnification can be obtained and the system allows the focal point to fall on the surface of the photoconductor drum 43).

The optical printer 41 shown in FIG. 3 has the same configuration as that of a typical optical printer, and it forms an image on the paper 44 by the same mechanism as that employed in the general optical printer. To be more concrete, a photosensitive layer made of a material (a photoreceptor) having photoconductivity, such as amorphous Si, is formed on the surface of the photoconductor drum 43 of a cylindrical shape. Initially, the surface of the photoconductor drum 43 that is rotating is charged uniformly with an electrostatic charger 46. Subsequently, light forming a dot image corresponding to an image to be formed is irradiated onto the photosensitive layer on the photoconductor drum 43 with the write head 42. The charge in a region of the photosensitive layer irradiated with the light thus is neutralized, and a latent image consequently is formed on the photosensitive layer. Subsequently, toner particles are attracted onto the photosensitive layer by a developer 47. Accordingly, toner particles adhere to the portion of the photosensitive layer where the latent image has been formed according to the charged state of the photosensitive layer. Subsequently, the toner particles thus adhering are transferred onto the paper 44 fed from a cassette with a transfer unit 48. Thereafter, a fixer 49 heats the paper 44 for the toner particles to be fixed onto the paper 44. An image thus is formed. Meanwhile, after the completion of the transfer, the charge across the entire area of the photoconductor drum 43 is neutralized with an erasing lamp 50, and toner particles remaining on the photosensitive layer are removed by a cleaner 40.

The optical device of the present invention is excellent in durability, and when applied, for example, to a scanner, a copying machine or a printer, it is possible to reproduce a clear image with high resolution.

EXAMPLES

Hereinafter, the present invention will be described more in detail using examples below. It should be appreciated, however, that the present invention is not limited to the examples below.

In the examples below, 14 types of mother glass compositions (Examples 1 through 8, Comparative Examples 1 through 4, and Reference Example) were manufactured while varying the compositions. Then, various properties of respective samples thus manufactured and gradient-index lenses obtained through ion exchange of the respective samples were evaluated.

Manufacturing of Mother Glass Composition and Gradient-Index Lens

Firstly, glass raw materials were mixed together so that the respective compositions set forth in Table 1 below were obtained. Subsequently, the glass raw materials were melted to form molten glass. Each molten glass was drawn in the shape of a fiber and the resulting glass was cut in an adequate length. Further, the end faces of the cut glass were polished. Glass fibers (having the diameter of 300 μm) made of the glass compositions having the respective compositions were thus obtained.

Subsequently, each glass fiber formed as above was immersed in a molten salt of sodium nitrate heated to the glass transition temperature (Tg: see Table 2 below) of the corresponding composition forming the wire for ion exchange to take place. The ion exchange was carried out over the times specified in the tIE (ion exchange time) column in Table 2 below. Subsequently, after the completion of ion exchange, each glass fiber was cut in one cycle length. Further, the end faces of each cut glass were polished. Gradient-index lenses were thus obtained.

TABLE 1

| Samples | $SiO_2$ | $TiO_2$ | MgO | ZnO | $Li_2O$ | $Na_2O$ | SrO | BaO | $B_2O_3$ | PbO |
|---|---|---|---|---|---|---|---|---|---|---|
| A (Example 1) | 53 | 3.5 | 13 | 1 | 9.5 | 9 | 4 | 4 | 3 | 0 |
| B (Example 2) | 53 | 3.5 | 8 | 6 | 9.5 | 9 | 4 | 4 | 3 | 0 |
| C (Example 3) | 53 | 3.5 | 3 | 11 | 9.5 | 9 | 4 | 4 | 3 | 0 |
| D (Example 4) | 53 | 3.5 | 1 | 13 | 9.5 | 9 | 4 | 4 | 3 | 0 |
| E (Example 5) | 53 | 3.5 | 8 | 2 | 9.5 | 9 | 6 | 6 | 3 | 0 |
| F (Example 6) | 53 | 3.5 | 7 | 3 | 9.5 | 9 | 6 | 6 | 3 | 0 |
| G (Example 7) | 53 | 3.5 | 5 | 5 | 9.5 | 9 | 6 | 6 | 3 | 0 |
| H (Example 8) | 53 | 3.5 | 1 | 9 | 9.5 | 9 | 6 | 6 | 3 | 0 |
| I (Comparative Example 1) | 53 | 3.5 | 14 | 0 | 9.5 | 9 | 4 | 4 | 3 | 0 |
| J (Comparative Example 2) | 53 | 3.5 | 0 | 14 | 9.5 | 9 | 4 | 4 | 3 | 0 |
| K (Comparative Example 3) | 53 | 3.5 | 10 | 0 | 9.5 | 9 | 6 | 6 | 3 | 0 |
| L (Comparative Example 4) | 53 | 3.5 | 0 | 10 | 9.5 | 9 | 6 | 6 | 3 | 0 |
| M (Reference Example) | 56 | 3.5 | 14 | 0 | 9.5 | 9 | 0 | 2 | 0 | 6 |

The content of each component is indicated by mol %.

TABLE 2

| Samples | Specific Gravity [g/cm³] | Refractive Index Nc | Glass Transition Temperature Tg [° C.] | tIE [hours] |
|---|---|---|---|---|
| A (Example 1) | 2.901 | 1.589 | 472 | 9.7 |
| B (Example 2) | 2.997 | 1.594 | 481 | 9.5 |
| C (Example 3) | 3.082 | 1.599 | 473 | 11.6 |
| D (Example 4) | 3.111 | 1.601 | 472 | 12.7 |
| E (Example 5) | 2.972 | 1.598 | 476 | 10.7 |
| F (Example 6) | 2.990 | 1.599 | 473 | 10.8 |
| G (Example 7) | 3.025 | 1.601 | 469 | 10.9 |
| H (Example 8) | 3.094 | 1.605 | 474 | 13.5 |
| I (Comparative Example 1) | 2.892 | 1.588 | 480 | 9.9 |
| J (Comparative Example 2) | 3.125 | 1.602 | 471 | 13.3 |
| K (Comparative Example 3) | 2.938 | 1.596 | 484 | 10.8 |
| L (Comparative Example 4) | 3.112 | 1.606 | 474 | 14.3 |
| M (Reference Example) | 3.140 | 1.610 | 445 | 11.5 |

Evaluation of Properties

Properties of the mother glass compositions and gradient-index lenses manufactured as above were evaluated in the manners as follows. The results of evaluation are set forth in Table 3 (devitrification, angular aperture, weight loss, and weather resistance) and Table 4 (eluted components) below.

(1) Evaluation on Devitrification of Mother Glass Composition

Molten glasses obtained when manufacturing the glass fibers were cooled and the degree at which crystals were produced on the surface of the glass compositions after solidification was observed. The observation was carried out visually. The glass compositions on the surface of which were observed no crystals were rated as "A". Those on the surface of which were observed 1 to 10 crystals per 50 mm square were rated as "B". Those on the surface of which were observed 11 or more crystals per 50 mm square were rated as "C".

(2) Evaluation on Angular Aperture θ of Gradient-Index Lens

The angular aperture θ means the maximum angle of incidence at which the direction of light flux can be changed by a lens. In this example, the angular apertures θ of the gradient-index lenses were evaluated according to the method described in Reference 8 (JP2005-289775A). To be more concrete, the evaluation was carried out as follows.

Initially, the gradient-index lens manufactured as above were cut to an adequate length, and the end faces on the both sides were mirror-polished until the both ends became parallel to each other. Subsequently, a grating pattern was brought into contact with one of the end faces of the lens and the erected image of this pattern was observed from the other end face to find the cycle length P. From the cycle length P thus found, the refractive index distribution coefficient of the lens, $\sqrt{A}$, was calculated using the relation expression of $\sqrt{A}=2\pi/P$. Then, the angular aperture θ of the lens was found in accordance with an equation:

$$\sin\theta = \sqrt{A} \cdot Nc \cdot r0$$

where $\sqrt{A}$ is the refractive index distribution coefficient of the lens calculated as above, r0 is the radius of the lens, and Nc is the refractive index of the glass fiber before ion exchange that was previously measured by the critical angle of total reflection method using a Pulfrich refractometer (see Table 2 above).

(3) Evaluation on Water Resistance of Mother Glass Composition (Evaluation on Weight Loss and Evaluation on Eluted Components)

Evaluation on water resistance of the mother glass compositions was carried out by measuring a weight loss under the measurement condition that the temperature was 95° C. and the evaluation time was 1 hour in accordance with Japan Optical Glass Industry Standard (JOGIS-99). Glass compositions having a smaller weight loss have higher water resistance. For example, the specific gravity of Sample A was 2.901 g/cm³ (see Table 2 above) and the weight loss was 0.07% (see Table 3 below).

Amounts of components eluted from the composition samples into water also were measured during the evaluation on the weight loss. Amounts eluted into water were determined by the plasma emission spectrometry for B, Mg, Sr, Ba, and Zn, and by the flame analysis for Li and Na. Amounts (μg) of the respective eluted elements per 1 g of the composition samples are set forth in Table 4 below.

(4) Evaluation on Weather Resistance of Gradient-Index Lens

A constant temperature and humidity test was carried out for the gradient-index lenses manufactured as above under the measurement condition that the temperature was 60° C., the relative humidity was 90% and the evaluation time was 1000 hours. Evaluation was made by visually checking whether any precipitate was produced in the lenses after the test and an amount of precipitate when the precipitate was produced. The weather resistance of the lenses was evaluated by judging to which of the following criteria the evaluation results fit:

A: the precipitate was absent or only a minor amount was present;

B: although the precipitate was present, the lens performance was not affected;

C: the precipitate was present and the use of the lens was limited because the lens performance was deteriorated; and D: a large amount of the precipitate was present and the lens performance was deteriorated markedly.

The phrase, "the lens performance was not affected", used herein means that deterioration ratio of the resolution (image reproduction ratio) before and after the weather resistance test was less than 10%. The phrase, "the use of the lens was limited because the lens performance was deteriorated", used herein means that the deterioration ratio was in a range of 10% to less than 20%. The phrase, "the lens performance was deteriorated markedly", used to herein means that the deterioration ratio was 20% or greater.

The deterioration ratio is a numerical value expressed as ("image reproduction ratio before weather resistance test"−"image reproduction ratio after the test")/"image reproduction ratio before the test"×100 (%). The image reproduction ratio of the lens can be found according to the method described in Reference 8 (JP2005-289775A).

TABLE 3

| Samples | ZnO [mol %] | ZnO + MgO [mol %] | ZnO/ (MgO + ZnO) | Devitrification | Angular Aperture θ [°] | Weight Loss [%] | Weather Resistance |
|---|---|---|---|---|---|---|---|
| A (Example 1) | 1 | 14 | 0.07 | A | 11.9 | 0.07 | C |
| B (Example 2) | 6 | 14 | 0.43 | A | 12.0 | 0.02 | A |
| C (Example 3) | 11 | 14 | 0.79 | A | 11.6 | 0.01 | A |
| D (Example 4) | 13 | 14 | 0.93 | B | 10.8 | 0.01 | A |
| E (Example 5) | 2 | 10 | 0.2 | A | 11.1 | 0.05 | C |
| F (Example 6) | 3 | 10 | 0.3 | A | 11.3 | 0.02 | B |
| G (Example 7) | 5 | 10 | 0.5 | A | 11.2 | 0.02 | B |
| H (Example 8) | 9 | 10 | 0.9 | B | 10.1 | 0.02 | B |
| I (Comparative Example 1) | 0 | 14 | 0 | A | 11.9 | 0.08 | D |
| J (Comparative Example 2) | 14 | 14 | 1 | C | 10.3 | 0.01 | A |
| K (Comparative Example 3) | 0 | 10 | 0 | A | 10.4 | 0.10 | D |
| L (Comparative Example 4) | 14 | 10 | 1 | C | 9.5 | 0.02 | A |
| M (Reference Example) | 0 | 14 | 0 | A | 11.9 | 0.02 | B |

TABLE 4

| | Amounts of respective eluted components per 1 g of Samples (μg) | | | | | | | |
|---|---|---|---|---|---|---|---|---|
| Samples | Zn | Mg | Li | Na | Sr | Ba | B | Total |
| A (Example 1) | <0.5 | 7 | 37 | 114 | 36 | 38 | 16 | 248 |
| B (Example 2) | <0.5 | 3 | 6 | 16 | 9 | 11 | 2 | 47 |
| C (Example 3) | 1 | 2 | 5 | 12 | 7 | 8 | 1 | 35 |
| D (Example 4) | 2 | 1 | 5 | 15 | 6 | 7 | 1 | 36 |
| E (Example 5) | 1 | 4 | 29 | 95 | 36 | 42 | 9 | 216 |
| F (Example 6) | 1 | 3 | 7 | 23 | 18 | 25 | 2 | 79 |
| G (Example 7) | 1 | 2 | 7 | 23 | 17 | 23 | 1 | 74 |
| H (Example 8) | 2 | 1 | 5 | 16 | 12 | 16 | 1 | 52 |
| I (Comparative Example 1) | 0 | 7 | 49 | 160 | 42 | 43 | 22 | 323 |
| J (Comparative Example 2) | 2 | 0 | 5 | 16 | 6 | 7 | 1 | 37 |
| K (Comparative Example 3) | 0 | 7 | 74 | 240 | 71 | 77 | 22 | 491 |
| L (Comparative Example 4) | 2 | 0 | 5 | 15 | 11 | 15 | 1 | 48 |
| M (Reference Example) | 0 | 7 | 14 | 38 | 0 | 11 | 0 | 70 |

As set forth in Tables 3 and 4, Comparative Examples 1 and 3 had large weight losses and amounts of eluted components (that is, poor water resistance) as mother glass compositions, and were found to be inferior in weather resistance when they were made into gradient-index lenses. Comparative Examples 2 and 4 that included ZnO and no MgO were excellent in weather resistance but devitrification occurred therein.

On the contrary, Examples 1 through 8 were excellent not only in water resistance as mother glass compositions, but also in weather resistance when they were made into gradient-index lenses. In particular, Examples 2 through 4 and 6 through 8, in which the content of ZnO was 3 mol % or greater, were excellent in water resistance and weather resistance as mother glass compositions and also when they were made into gradient-index lenses. In Examples 1 through 8, either devitrification had not occurred at all or occurred so slightly that each had no problem for use as gradient-index lenses.

Sample M was the reference example including PbO. Although Examples 1 through 8 were lead-free mother glass compositions, the gradient-index lenses manufactured from these mother glass compositions each achieved properties as good as those of the reference example.

Subsequently, a lens array as shown in FIG. 1 was manufactured by applying concavo-convex treatment to the side surfaces of the respective gradient-index lenses manufactured from the glass compositions of Examples 1 through 8 with the aim of removing noise light, and then aligning plural of the lenses in a 2-dimensional array.

The image reproducibility was evaluated as the optical property of the lens array thus manufactured using the method (Modulation Transfer Function (MTF) method) described in Reference 8 (JP2005-289775A). Then, the image reproduction ratio as high as or higher than 60% was achieved with the gradient-index lens manufactured from any of the glass compositions of Examples 1 through 8.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A mother glass composition for gradient-index lens, comprising following components, indicated by mol %:
   $40 \leq SiO_2 \leq 65$;
   $1 \leq TiO_2 \leq 10$;
   $0.1 \leq MgO \leq 22$;
   $3 \leq ZnO \leq 15$;
   $2 \leq Li_2O \leq 18$;
   $2 \leq Na_2O \leq 20$;
   $0 \leq B_2O_3 \leq 20$;
   $0 \leq Al_2O_3 \leq 10$;
   $0 \leq K_2O \leq 3$;
   $0 \leq Cs_2O \leq 3$;
   $0 \leq Y_2O_3 \leq 5$;
   $0 \leq ZrO_2 \leq 2$;
   $0 \leq Nb_2O_5 \leq 5$;
   $0 \leq In_2O_3 \leq 5$;
   $0 \leq La_2O_3 \leq 5$; and
   $0 \leq Ta_2O_5 \leq 5$,
   wherein the mother glass composition further comprises at least two oxides selected from the group consisting of CaO, SrO, and BaO each in a range of 0.1 mol % to 15 mol %,
   where a total of MgO+ZnO is greater than or equal to 6 mol %,
   a molar ratio of ZnO/(MgO+ZnO) is in a range of 0.12 to 0.93,
   a total of $Li_2O+Na_2O$ is in a range of 6 mol % to 38 mol %, and
   a total of $Y_2O_3+ZrO_2+Nb_2O_5+In_2O_3+La_2O_3+Ta_2O_5$ is in a range of 0 mol % to 11 mol %.

2. The mother glass composition for gradient-index lens according to claim 1, wherein:
   the content of $Li_2O$ is in a range of 2 mol % to less than 12 mol %; and
   the total of $Li_2O+Na_2O$ is in a range of 6 mol % to less than 32 mol %.

3. The mother glass composition for gradient-index lens according to claim 1, wherein the contents of the following components, indicated by mol %, are:
   $2 \leq MgO \leq 22$;
   $4 \leq ZnO \leq 15$;
   $0 \leq CaO \leq 15$;
   $0.1 \leq SrO \leq 15$;
   $0.1 \leq BaO \leq 15$;
   $2 \leq Li_2O \leq 12$; and
   $2 \leq Na_2O \leq 15$,
   where the total of MgO+ZnO is grater than or equal to 6 mol %,
   the molar ratio of ZnO/(MgO+ZnO) is in a range of 0.25 to 0.85,
   a total of CaO+SrO+BaO is in a range of 2 mol % to 25 mol %,
   a total of MgO+CaO+SrO+BaO is in a range of 5 mol % to 47 mol %,
   the total of $Li_2O+Na_2O$ is in a range of 6 mol % to less than 27 mol %, and
   a total of $SiO_2+TiO_2+B_2O_3+Al_2O_3$ is in a range of 41 mol % to 70 mol %.

4. The mother glass composition for gradient-index glass according to claim 3, wherein the content of $B_2O_3$ is in a range of 1 mol % to 10 mol %.

5. The mother glass composition for gradient-index lens according to claim 1, wherein the contents of the following components, indicated by mol %, are:
   $0 \leq B_2O_3 \leq 10$;
   $2 \leq MgO \leq 16$;
   $4 \leq ZnO \leq 8$;
   $0 \leq CaO \leq 15$;
   $2 \leq SrO \leq 12$;
   $2 \leq BaO \leq 12$;
   $5 \leq Li_2O < 12$;
   $5 \leq Na_2O \leq 15$; and
   $0.2 \leq ZrO_2 \leq 2$,
   where the total of MgO+ZnO is in a range of 6 mol % to 22 mol %,
   the molar ratio of ZnO/(MgO+ZnO) is in a range of 0.25 to 0.8,
   a total of CaO+SrO+BaO is in a range of 4 mol % to 20 mol %,
   a total of MgO+CaO+SrO+BaO is in a range of 5 mol % to 36 mol %,
   the total of $Li_2O+Na_2O$ is in a range of 10 mol % to less than 27 mol %,
   a molar ratio of $Li_2O/Na_2O$ is in a range of 0.7 to 2,
   a total of $SiO_2+TiO_2+B_2O_3+Al_2O_3$ is in a range of 50 mol % to 70 mol %, and
   the total of $Y_2O_3+ZrO_2+Nb_2O_5+In_2O_3+La_2O_3+Ta_2O_5$ is in a range of 0.2 mol % to 6 mol %.

6. The mother glass composition for gradient-index lens according to claim 5, wherein the content of $B_2O_3$ is in a range of 1 mol % to 10 mol %.

7. The mother glass composition for gradient-index lens according to claim 1, wherein the contents of the following components, indicated by mol %, are:
   $2 \leq TiO_2 \leq 8$;
   $0 \leq B_2O_3 \leq 10$;
   $2 \leq MgO \leq 16$;
   $4 \leq ZnO \leq 8$;
   $0 \leq CaO \leq 15$;
   $2 \leq SrO \leq 12$;
   $2 \leq BaO \leq 12$;
   $5 \leq Li_2O < 12$;
   $5 \leq Na_2O \leq 15$; and
   $0.2 \leq ZrO_2 \leq 2$,
   where the total of MgO+ZnO is in a range of 6 mol % to 22 mol %,
   the molar ratio of ZnO/(MgO+ZnO) is in a range of 0.25 to 0.8,
   a total of CaO+SrO+BaO is in a range of 4 mol % to 20 mol %,
   a total of MgO+CaO+SrO+BaO is in a range of 5 mol % to 36 mol %,
   the total of $Li_2O+Na_2O$ is in a range of 10 mol % to less than 27 mol %,
   a molar ratio of $Li_2O/Na_2O$ is in a range of 0.7 to 2,
   a total of $SiO_2+TiO_2+B_2O_3+Al_2O_3$ is in a range of 50 mol % to 70 mol %, and
   the total of $Y_2O_3+ZrO_2+Nb_2O_5+In_2O_3+La_2O_3+Ta_2O_5$ is in a range of 0.2 mol % to 6 mol %.

8. The mother glass composition for gradient-index lens according to claim 7, wherein the content of $B_2O_3$ is in a range of 1 mol % to 10 mol %.

9. The mother glass composition for gradient-index lens according to claim 1, wherein at least two values of molar ratios selected from the group consisting of:

CaO/(CaO+SrO+BaO);
SrO/(CaO+SrO+BaO); and
BaO/(CaO+SrO+BaO)
are at least 0.1.

10. The mother glass composition for gradient-index lens according to claim 1, wherein at least two values of molar ratios selected from the group consisting of:
CaO/(CaO+SrO+BaO);
SrO/(CaO+SrO+BaO); and
BaO/(CaO+SrO+BaO)
are at least 0.2.

11. The mother glass composition for gradient-index lens according to claim 1, wherein the contents of SrO and BaO are each in a range of 0.1 mol % to 15 mol %.

12. The mother glass composition for gradient-index lens according to claim 1, wherein the contents of SrO and BaO are each in a range of 2 mol % to 12 mol %.

13. A gradient-index lens, obtained by providing a glass fiber made of the mother glass composition for gradient-index lens according to claim 1 with a refractive index distribution by an ion exchange method.

14. The gradient-index lens according to claim 13, wherein the gradient-index lens has a structure to eliminate noise light.

15. An optical product comprising the gradient-index lens according to claim 13.

16. An optical device comprising the optical product according to claim 15.

17. A method for manufacturing a gradient-index lens, comprising:
immersing a glass fiber made of a glass composition including an oxide of an alkali metal element as a component in a molten salt including an alkali metal element different from the element in the glass fiber for letting ion exchange take place between the element in the glass fiber and the element in the molten salt, so that an refractive index distribution is provided to the glass fiber,
wherein the glass composition comprises following components, indicated by mol %;
$40 \leq SiO_2 \leq 65$;
$1 \leq TiO_2 \leq 10$;
$0.1 \leq MgO \leq 22$;
$3 \leq ZnO \leq 15$;
$2 \leq Li_2O \leq 18$;
$2 \leq Na_2O \leq 20$;
$0 \leq B_2O_3 \leq 20$;
$0 \leq Al_2O_3 \leq 10$;
$0 \leq K_2O \leq 3$;
$0 \leq Cs_2O \leq 3$;
$0 \leq Y_2O_3 \leq 5$;
$0 \leq ZrO_2 \leq 2$;
$0 \leq Nb_2O_5 \leq 5$;
$0 \leq In_2O_3 \leq 5$;
$0 \leq La_2O_3 \leq 5$; and
$0 \leq Ta_2O_5 \leq 5$,
wherein the glass composition further comprises at least two oxides selected from the group consisting of CaO, SrO, and BaO each in a range of 0.1 mol % to 15 mol %,
where a total of MgO+ZnO is greater than or equal to 6 mol %,
a molar ratio of ZnO/(MgO+ZnO) is in a range of 0.12 to 0.93,
a total of $Li_2O+Na_2O$ is in a range of 6 mol % to 38 mol %, and
a total of $Y_2O_3+ZrO_2+Nb_2O_5+In_2O_3+La_2O_3+Ta_2O_5$ is in a range of 0 mol % to 11 mol %.

18. A mother glass composition for gradient-index lens, comprising following components, indicated by mol %:
$40 \leq SiO_2 \leq 65$;
$1 \leq TiO_2 \leq 10$;
$0.1 \leq MgO \leq 22$;
$6 \leq ZnO \leq 15$;
$2 \leq Li_2O \leq 18$;
$2 \leq Na_2O \leq 20$;
$0 \leq B_2O_3 \leq 20$;
$0 \leq Al_2O_3 \leq 10$;
$0 \leq K_2O \leq 3$;
$0 \leq Cs_2O \leq 3$;
$0 \leq Y_2O_3 \leq 5$;
$0 \leq ZrO_2 \leq 2$;
$0 \leq Nb_2O_5 \leq 5$;
$0 \leq In_2O_3 \leq 5$;
$0 \leq La_2O_3 \leq 5$; and
$0 \leq Ta_2O_5 \leq 5$,
wherein the mother glass composition further comprises at least two oxides selected from the group consisting of CaO, SrO, and BaO each in a range of 0.1 mol % to 15 mol %,
where a molar ratio of ZnO/(MgO+ZnO) is in a range of 0.21 to 0.93,
a total of $Li_2O+Na_2O$ is in a range of 6 mol % to 38 mol %, and
a total of $Y_2O_3+ZrO_2+Nb_2O_5+In_2O_3+La_2O_3+Ta_2O_5$ is in a range of 0 mol % to 11 mol %.

19. A method for manufacturing a gradient-index lens, comprising:
immersing a glass fiber made of a glass composition including an oxide of an alkali metal element as a component in a molten salt including an alkali metal element different from the element in the glass fiber for letting ion exchange take place between the element in the glass fiber and the element in the molten salt, so that an refractive index distribution is provided to the glass fiber,
wherein the glass composition comprises following components, indicated by mol %:
$40 \leq SiO_2 \leq 65$;
$1 \leq TiO_2 \leq 10$;
$0.1 \leq MgO \leq 22$;
$6 \leq ZnO \leq 15$;
$2 \leq Li_2O \leq 18$;
$2 \leq Na_2O \leq 20$;
$0 \leq B_2O_3 \leq 20$;
$0 \leq Al_2O_3 \leq 10$;
$0 \leq K_2O \leq 3$;
$0 \leq Cs_2O \leq 3$;
$0 \leq Y_2O_3 \leq 5$;
$0 \leq ZrO_2 \leq 2$;
$0 \leq Nb_2O_5 \leq 5$;
$0 \leq In_2O_3 \leq 5$;
$0 \leq La_2O_3 \leq 5$; and
$0 \leq Ta_2O_5 \leq 5$,
wherein the glass composition further comprises at least two oxides selected from the group consisting of CaO, SrO, and BaO each in a range of 0.1 mol % to 15 mol %,
where a molar ratio of ZnO/(MgO+ZnO) is in a range of 0.21 to 0.93,
a total of $Li_2O+Na_2O$ is in a range of 6 mol % to 38 mol %, and
a total of $Y_2O_3+ZrO_2+Nb_2O_5+In_2O_3+La_2O_3+Ta_2O_5$ is in a range of 0 mol % to 11 mol %.

* * * * *